United States Patent [19]

Sangregory et al.

[11] Patent Number: 4,933,690

[45] Date of Patent: Jun. 12, 1990

[54] SLIDE CHANGING APPARATUS WITH SLIDE JAM PROTECTION

[75] Inventors: Jude A. Sangregory, Rochester; Michael L. Wirt, Avon; Robert W. Easterly, Churchville, all of N.Y.

[73] Assignee: Eastman Kodak, Rochester, N.Y.

[21] Appl. No.: 264,559

[22] Filed: Oct. 31, 1988

[51] Int. Cl.$^5$ ............................................. G03B 23/02
[52] U.S. Cl. ..................................... 353/103; 353/111
[58] Field of Search ............................... 353/103–107, 353/111–118

[56] References Cited

U.S. PATENT DOCUMENTS

| | | | |
|---|---|---|---|
| 3,411,845 | 11/1968 | Pester et al. | 353/88 |
| 3,413,060 | 11/1968 | Rube | 353/115 |
| 3,572,920 | 3/1971 | Heinzmann | 353/103 |
| 3,644,028 | 2/1972 | Rube | 353/103 |
| 3,754,818 | 8/1973 | Gehlert | 353/114 |
| 4,487,488 | 12/1984 | Burbank, III | 353/122 |

Primary Examiner—William A. Cuchlinski, Jr.
Assistant Examiner—Patrick R. Scanlon
Attorney, Agent, or Firm—James A. Smith

[57] ABSTRACT

A slide changing apparatus is disclosed for use in a projection apparatus wherein photographic slides can be projected onto a screen or viewed on a video monitor. The slide changing mechanism includes a lever having a displaceable part which engages a slide and transfers the photographic slide from a projection position to a slide tray wherein slides are accommodated. A microprocessor controls the operation of a driving apparatus which is connected to the lever and actuates the lever. If a slide becomes jammed during movement between the projection position and the slide tray the displaceable part of the lever becomes displaced from its original position. The displacement of the displaceable part is detected by an optical switch and the optical switch outputs a signal to the microprocessor to stop the motor before damage to the jammed slide can occur.

9 Claims, 5 Drawing Sheets

SLIDE CHANGING APPARATUS WITH SLIDE JAM PROTECTION

CROSS REFERENCE TO RELATED APPLICATIONS

Reference is made to commonly assigned, patent application Ser. No. 142,991, entitled MECHANISM FOR HANDLING SLIDES AND FILM STRIPS, and filed Jan. 12, 1988 in the name of Michael Wirt.

Reference is made to commonly assigned, patent application Ser. No. 143,661, entitled FILM VIDEO PLAYER APPARATUS, and filed Jan. 13, 1988 in the name of Mark E. Bridges.

1. Field of the Invention

The subject invention relates to a slide changing mechanism for use in a projection apparatus used in conjunction with a slide tray in which photographic slides are stored and more specifically to a slide changing mechanism for moving the slides from a projection position into the slide tray.

2. Background of the Invention

Apparatus for moving a photographic slide from a tray containing a plurality of slides to a projection position for projection onto a screen then back to the tray is well known in the art. U.S. Pat. No. 3,411,845 to Pester shows such a slide changing mechanism. In this patent a slide lifter mechanism includes a double arm lever pivotally mounted on a bracket. One arm is provided with a pin constituting a cam follower. The pin is biased into engagement by a coil spring attached between the lever and the bracket. A cam actuates the lever such that in one cycle of the cam the lever will move from one position to a second position and back to the original position. If a jammed slide prevents the upward movement of the lever, its yieldable connection through the spring permits the lever to yield despite the continued motion of the cam, so that upon possible jamming of the slide it cannot be damaged.

The apparatus disclosed in U.S. Pat. No. 3,411,845 has the disadvantage of not warning the operator if a slide is jammed. The operator realizes a slide is jammed if the desired slide is not projected on the screen. The operator must then continue pressing a control button controlling a cam drive means to unjam the slide or turn off the projector, remove the tray, then remove the jammed slide.

U.S. Pat. No. 4,487,488 to Burbank, III shows a storage and retrieval system for microfiche cards including a buckling detecting device comprising a light-receiving detecting device for signalling the control mechanism of the storage and retrieval system. The buckling detecting device senses if a microfiche card bends or buckles due to an obstruction as the microfiche card is re-entering a carousel tray. The control device is responsive to the detecting device such that the system would discontinue further operation of the storage and retrieval system if the microfiche card is bent or buckled.

While the storage retrieval system of U.S. Pat. No. 4,487,488 functions to alert the operator to a possible jammed microfiche card, it suffers from the disadvantage of delaying the detection of a jammed microfiche card until the card is bent or buckled. Thus possible permanent damage to the card can occur.

SUMMARY OF THE INVENTION

The present invention is directed to a slide changing mechanism including a slide jam protection safety feature wherein control means will interrupt the operation of a projection apparatus before damage to a slide occurs if the slide is jammed.

The slide changing mechanism of the present invention is provided with a lever having a displacable part for moving a slide from a first position to a second position. Drive means are connected to the lever for actuating the lever. The displacable part of the lever will become displaced if a slide becomes jammed during movement between the first and second positions. Sensing means are provided for detecting the displacement of the part of the lever. Control means responsive to the sensing means will interrupt the operation of the drive means if a slide becomes jammed. Hence, damage to the slide is prevented by detecting the displacement of the displacable part.

BRIEF DESCRIPTION OF THE DRAWINGS

Other advantages of the invention will become apparent from the following description taken in connection with the accompanying drawings wherein.

DETAILED DESCRIPTION OF THE INVENTION

Figure 1:
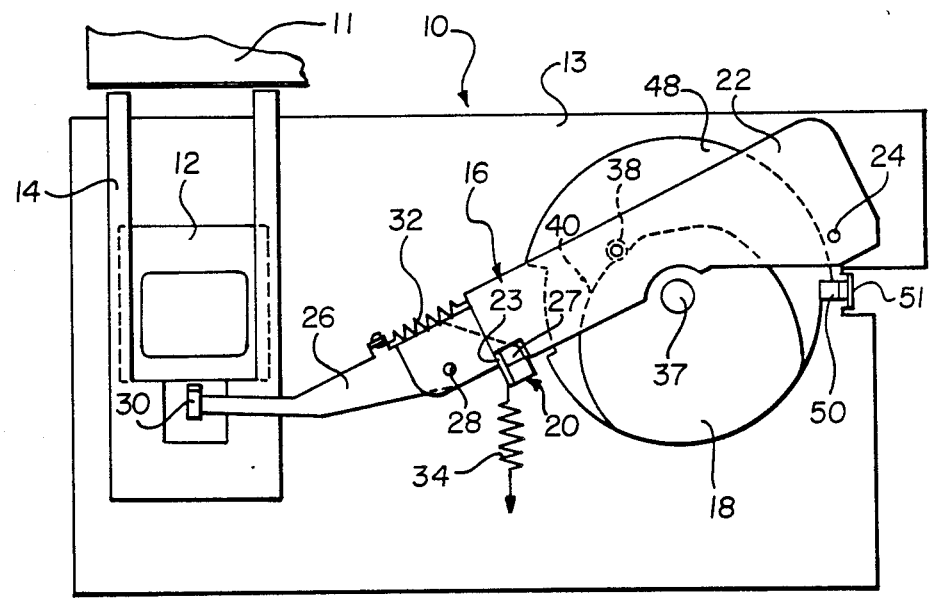
FIG. 1 is a side view of a slide changing apparatus in accordance with the present invention.
Figure 5:
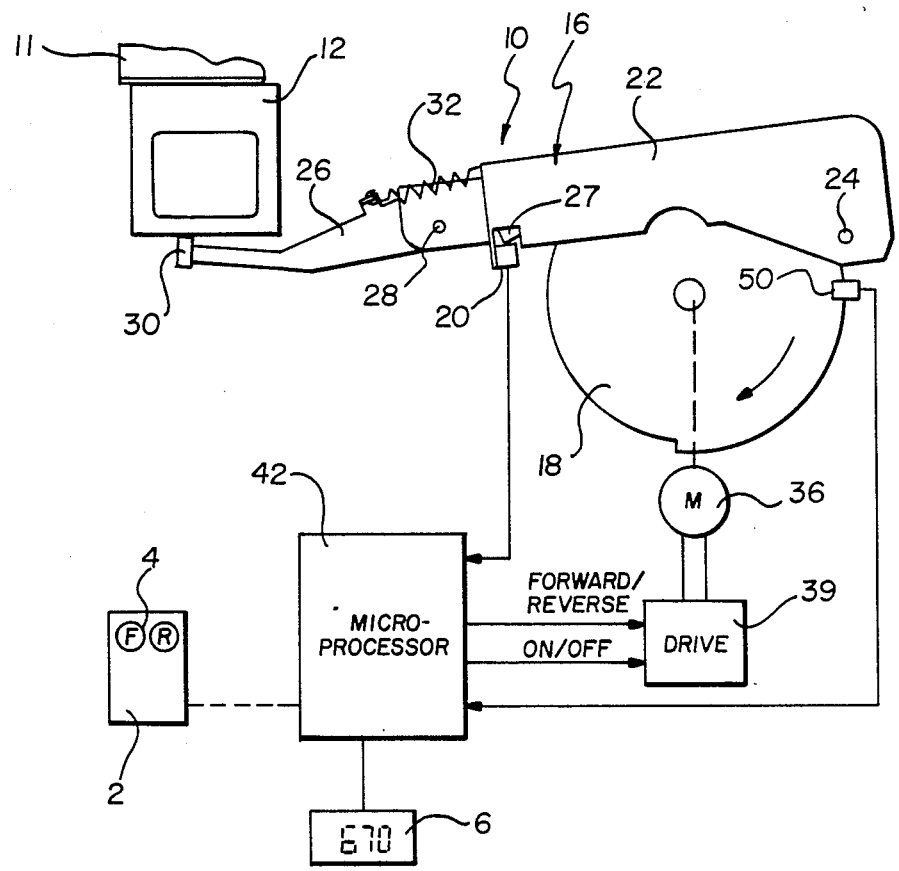
FIG. 5 is a side view of a portion of the slide changing mechanism and a block diagram of the control means.

The apparatus for moving a slide according to a preferred embodiment of the present invention is generally indicated by the numeral 10 in FIG. 1. The slide changing mechanism 10 is suitable for use, for example, in a film video player apparatus disclosed in U.S. application Ser. No. 143,661 by M. E. Bridges the disclosure of which is hereby incorporated by reference. A commercially available Kodak Carousel 80 Slide Tray or equivalent wherein a plurality of photographic slides 12 are accommodated can be used in conjunction with the film video player. Referring to FIG. 5 a projection apparatus as described above generally includes a control box 2 for controlling the operation of the film video player comprising a forward/reverse button 4 for controlling the movement of the slide tray 11. An alphanumeric display 6 such as a HDSP-7511 light emitting diode (LED) display commercially available from Hewlett Packard is generally included for displaying the numerical position of the slide tray 11 and error messages. Of course the slide changing mechanism 10 is not limited for use in a film video player, for example, it can be used in a commercially available KODAK CAROUSEL 5600 SLIDE PROJECTOR or equivalent, thus its use is not limited solely to any specific type of projection apparatus.

As shown in FIG. 1 the slide changing mechanism 10 of the present invention includes generally a support plate 13, a lever 16 for engaging and moving a photographic slide 12, a cam 18 for actuating the lever 16 and sensor means 20 for detecting a jammed slide 12.

The support plate 13 is provided with an aperture 15 which defines a projection position for the slide 12. A gate 14 as disclosed in U.S. application Ser. No. 142,991 by M. Wirt the disclosure of which is hereby incorporated by reference is mounted to support plate 13 for holding a slide 12 in place during projection.

The lever 16 for moving a slide 12 from the projection position 15 to the slide tray 11 includes a first part 22 pivotally connected to the support plate 13 by a pivot pin 24 and a second part 26 pivotally connected to the first part 22 by a pivot pin 28. The second part 26 has a slide engaging element 30. A spring 32 has one end attached to the first part 22 of lever 16 and its other end attached to the second part 26 such that the second part 26 is biased into engagement with a projection 23 on the first part 22. A pin 38 mounted on the lever 16 serves as a cam follower and is biased into engagement with cam surface 40 of cam 18 by a spring 34.

A motor 36 connectible to a driver integrated circuit (IC) 39 shown in FIG. 5 drives the cam 18 which is rotatably supported by post 37 on support plate 13. The driver IC 39 comprises an L6202 IC commercially available from the SGS company and is connectible to a microprocessor 42. As the cam 18 rotates clockwise the lever 16 will follow the cam surface 40 such that in one complete cycle of the cam 18 the lever 16 will move from a first position to a second position and back to the first position causing the slide 12 to move from the projection position 15 to the slide tray 11 and allowing another slide to move into the projection position 15. In the event a slide jams during movement between the first and second positions the second part 26 of lever 16 will pivot on pin 28 against the bias of spring 32 and the operation of the motor 36 will be interrupted in response to a signal emitted by sensing means 20 mounted on the first part 22 of lever 16 as described in detail below.

Figure 2:
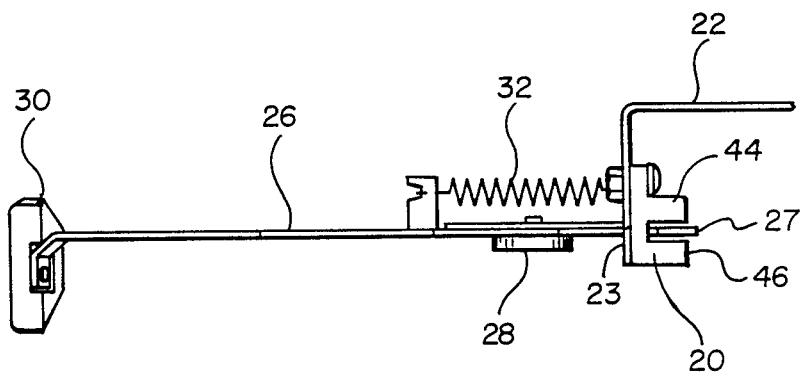
FIG. 2 is a bottom view of the sensing means shown in FIG. 1.

The sensing means 20 comprises an optical switch such as the KT8165 optical switch commercially available from the Optek company and has its output connected to the microprocessor 42 comprising a 8031 microprocessor commercially available from the Intel Corporation. As shown more clearly in FIG. 2 the optical switch 20 includes a light emitting diode (LED) 44 positioned on one side of a distal end 27 of the second part 26 of lever 16 and a photo sensitive diode (PSD) 46 positioned on the other side of the distal end 27 of the second part 26. When the second part 26 of lever 16 engages projection 23 the distal end 27 will block the light emitted by LED 44 and the output of PSD 46 will be zero. If the second part 26 becomes displaced relative to the first part 22 due to a jammed slide the distal end 27 will be moved out of its light blocking position and the PSD 46 will receive the beam of light emitted by the LED 44 and the optical switch 20 will produce an output signal which will cause the microprocessor 42 to interrupt the operation of the motor 36.

It will be apparent that the sensing means 20 can alternately include a mechanical switch (not shown) connectible between the lever 16 and the microprocessor 42. Although such a mechanical switch is suitable for use as a sensing means, it is not as reliable a switch as the optical switch.

Figure 3:
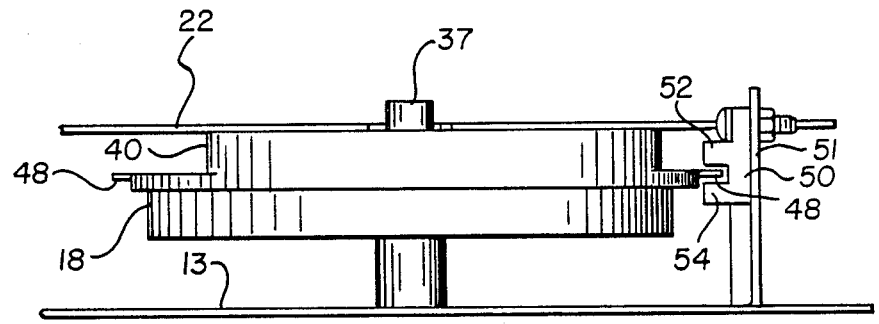
FIG. 3 is a bottom view of the position sensing means shown in FIG. 1.

Referring to FIGS. 1 and 5 the cam further includes a peripheral blade surface 48, the presence or absence thereof being detected by a position sensing means 50 mounted to a projection 51 on the support plate 13 and connected to the microprocessor 42. The position sensing means 50 comprises an optical switch such as a KT8165 optical switch commercially available from the Optek Corporation and has its output connected to the microprocessor 42. As shown in FIG. 3 the optical switch 50 comprises an LED 52 positioned on one side of the blade surface 48 and a PSD 54 positioned on the other side of the blade surface 48 such that the presence of the blade surface 48 will block the light emitted by the LED 52 and the output of the PSD 54 will be zero. When the blade surface 48 is absent the PSD 54 will receive the beam of light emitted by the LED 52 and send a signal to the microprocessor 42 which as described below will respond to deenergize the motor 36 during the slide changing operation.

Figure 6A:
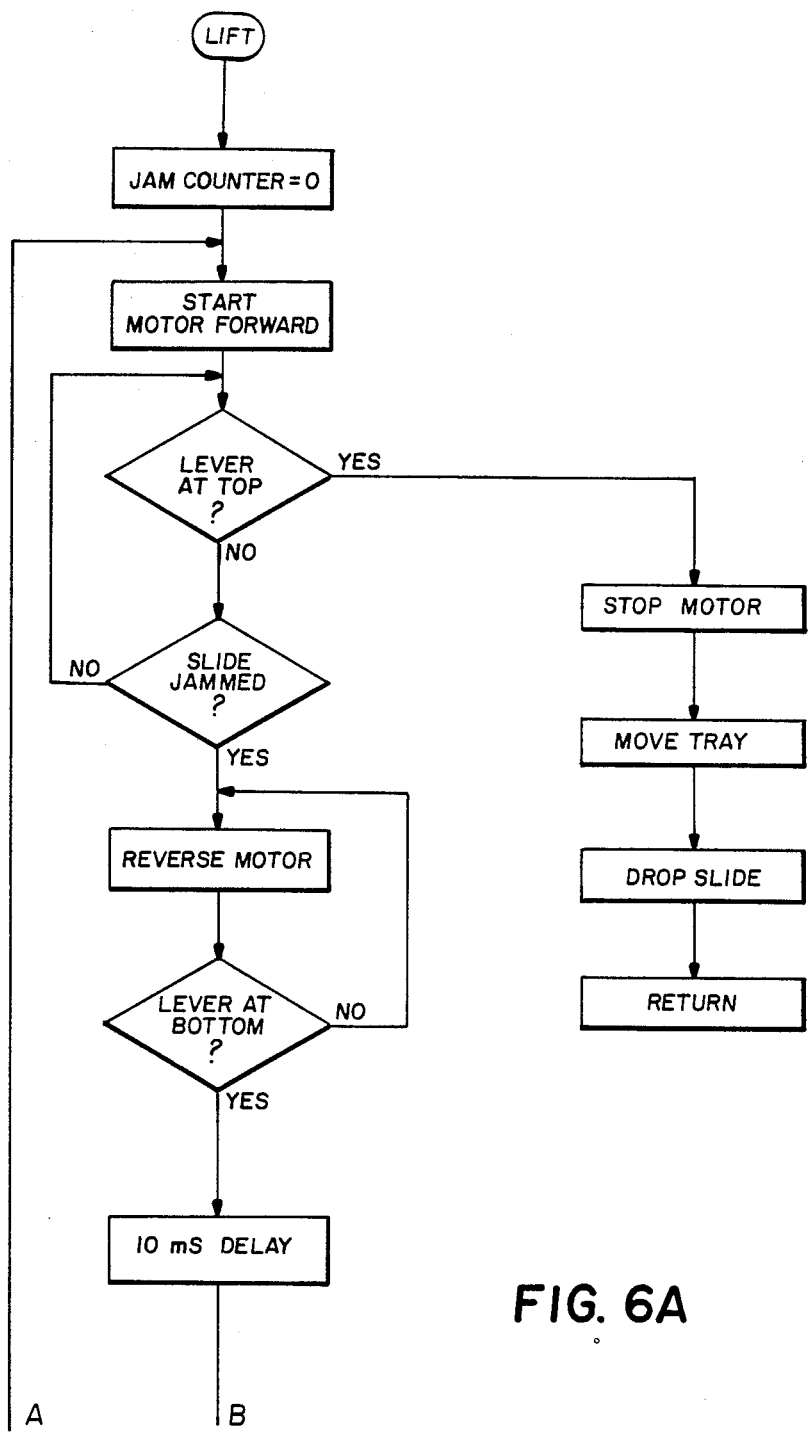
FIGS. 6A and 6B are a flowchart of the lift subroutine of the slide changing mechanism.
Figure 6B:
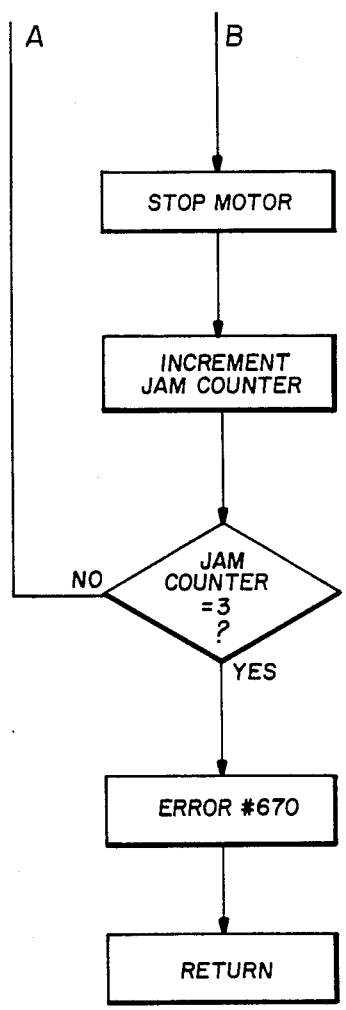

The operation of the slide changing mechanism 10 will be described in detail referring to FIGS. 1 to 5 and to the flow chart shown in FIGS. 6A and 6B characterizing a lift subroutine programmed into the microprocessor 42.

The projection apparatus is initialized with the slide tray 11 in a zero position. To start the operation of the projection apparatus an operator (not shown) presses the forward/reverse button 4 on the control box 2 signalling the microprocessor 42 to initiate movement of the slide tray 11. The slide tray 11 will rotate to a desired slide and the desired slide 12 will be gravity fed to the projection position 15 through the gate 14.

The lift subroutine is initialized when it is desirable to view or project another slide. The operator presses the forward/reverse button 4 on the control box 2 signalling the microprocessor 42 to initialize a jam counter and to energize the motor 36 for rotation in the forward direction through the driver IC 39. The lever 16 of the slide changing mechanism 10 is initially in a lower position as shown in FIG. 1 engaging a slide 12 in the projection position 15. The motor 36 drives the cam 18 in a clockwise rotation, actuating the lever 16 to begin to lift the slide 12 upward towards the slide tray 11.

When the lever 16 is at the top of its stroke and the slide 12 has entered the slide tray 11 the optical switch 50 senses the absence of the blade surface 48 and sends a signal to the microprocessor 42 to stop the motor 36. The slide tray 11 rotates to the next desired slide as described in U.S. application Ser. No. 142,991 by M. Wirt. The motor 36 is then turned on so that cam 18 can continue rotating clockwise thus moving the lever 16 back to the projection position permitting another slide to be gravity fed through the gate 14 to the projection position 15.

Figure 4:
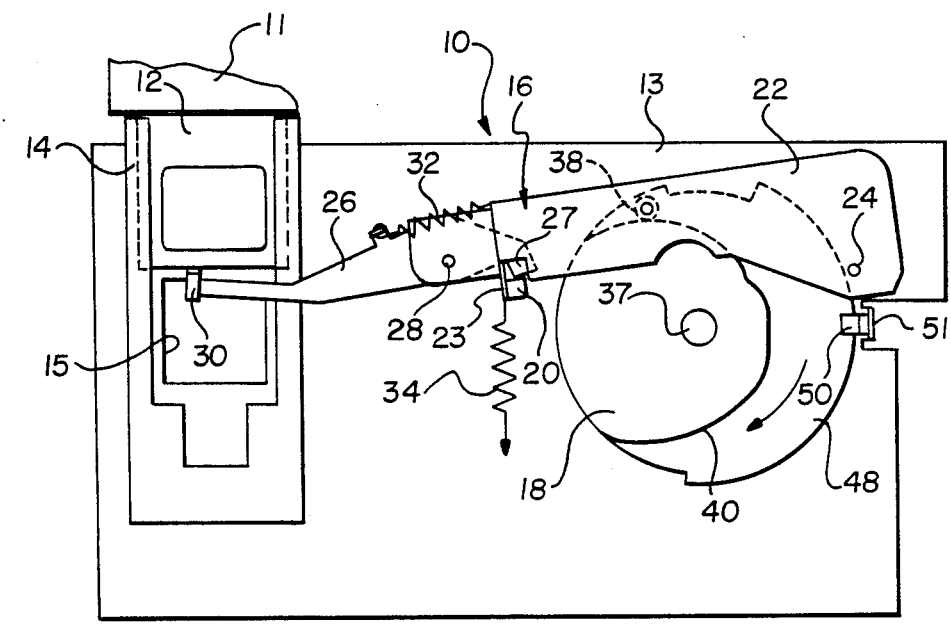
FIG. 4 is a side view of the slide changing mechanism showing the position of the parts when a photographic slide becomes jammed.

In the event the slide 12 hits an obstruction or becomes jammed during upward movement of the lever 16 as shown in FIG. 4 the second part 26 will rotate counterclockwise about pivot 28 to move the distal end 27 of the second part 26 out of the optical sensor 20 to permit the PSD 46 to receive a beam of light projected by the LED 44. The optical sensor 42 will now send a signal to the microprocessor 42 to reverse the direction of the motor 36. The motor 36 continues driving in the reverse direction thus driving the cam 18 in a counterclockwise direction until the lever 16 returns to the lower position shown in FIG. 1. A ten millisecond delay is incorporated into the program to allow the possibility of the slide 12 to disengage from a jammed position and fall into the projection position 15 without the assistance of the operator. The motor 36 is then stopped and the microprocessor 42 increments the jam counter one unit. The slide changing mechanism 10 will repeat the above described steps attempting to disengage the slide 12 until the slide 12 disengages from the jammed position or the jam counter reads some predetermined criteria, for example, the number three.

When the jam counter reads the number three indicating that three attempts to free the slide have failed the motor 36 will be deenergized and an error signal, for example, the numerical code 670 is displayed on the LED display 6, thus alerting the operator to a slide 12 which has become jammed. At this point the operator can choose to press the forward/reverse button 4 thus clearing the error signal and restarting the lift subroutine. The slide changing mechanism will attempt to disengage the jammed slide three more times before the motor 36 is deenergized. Or, the operator can choose to remove the slide tray 11 from the projection apparatus and manually remove the jammed slide 12. The operator can then replace the slide tray 11, press the forward/reverse button 4 clearing the error signal and energizing the motor 36 to continue viewing or projecting slides.

It will be apparent that the operator can press a CLEAR button (not shown) located on the control box 2 to clear the error signal from the LED display 6.

There is thus provided a jam protection feature associated with the slide changing mechanism 10 wherein the slide changing mechanism attempts to automatically disengage a slide from a jammed position and a slide will not be damaged due to the jammed position and the operator is alerted to the jammed slide.

The present invention has been described in detail with particular reference to a preferred embodiment thereof, but it will be understood that variations and modifications can be effected within the spirit and scope of the invention.

What is claimed is:

1. A slide changing apparatus for moving a photographic slide, the apparatus comprising:
   a lever having a displacable part for moving the slide from a first position to a second position, said part being displacable from said lever if the slide becomes jammed;
   drive means connected to said lever for actuating said lever;
   sensing means for detecting the displacement of said part if the slide becomes jammed during movement between said first position and said second position; and
   control means responsive to said sensing means for interrupting the operation of said drive means if the slide becomes jammed.

2. A slide changing apparatus as recited in claim 1 wherein
   said part is pivotally mounted on said lever; and
   further including spring means for biasing said part to a predetermined position relative to said lever, said part being yieldable from said position against the bias of said spring means upon jamming of the slide.

3. A slide changing apparatus as recited in claim 1 wherein said drive means comprises:
   a cam having a cam surface engaged by said lever such that said lever follows said cam surface; and
   a motor connected to said cam for driving said cam.

4. A slide changing apparatus as recited in claim 1 wherein said sensing means includes
   a light emitting diode positioned on one side of said part for projecting a beam of light; and
   a photo sensitive diode positioned on the other side of said part for receiving said beam of light if said part yields.

5. A slide changing apparatus as recited in claim 1 wherein said control means includes a programmable microcomputer having predetermined program criteria for interrupting the operation of said drive means.

6. A slide changing apparatus as recited in claim 5 wherein said predetermined criteria includes controlling said drive means so that said lever repeatably attempts to disengage the slide from a jammed position a predetermined number of times.

7. A slide changing apparatus as recited in claim 3 further including position sensing means connectible to said drive means and to said control means for controlling the operation of said drive means during the slide changing operation.

8. A slide changing apparatus as recited in claim 7 wherein said cam includes a blade surface; and
   wherein said position sensing means includes a light emitting diode positioned on one side of said blade surface for projecting a beam of light; and a photo sensitive diode positioned on the other side of said blade surface for receiving said beam of light
   such that the absence or presence of said blade surface activates said sensing means.

9. A slide changing apparatus as recited in claim 1 further including
   a slide tray for storing a plurality of photographic slides;
   a projection position for viewing or projecting the slide;
   said lever being adapted to move the slide from said projection position to said slide tray.

* * * * *